United States Patent
Dossi et al.

(10) Patent No.: US 10,882,935 B2
(45) Date of Patent: Jan. 5, 2021

(54) METHOD OF MANUFACTURING FLUOROELASTOMERS

(71) Applicant: SOLVAY SPECIALTY POLYMERS ITALY S.P.A., Bollate (IT)

(72) Inventors: Marco Dossi, Milan (IT); Marco Avataneo, Milan (IT)

(73) Assignee: SOLVAY SPECIALTY POLYMERS ITALY S.P.A., Bollate (IT)

(*) Notice: Subject to any disclaimer, the term of this patent is extended or adjusted under 35 U.S.C. 154(b) by 0 days.

(21) Appl. No.: 16/061,965

(22) PCT Filed: Dec. 14, 2016

(86) PCT No.: PCT/EP2016/080956
§ 371 (c)(1),
(2) Date: Jun. 13, 2018

(87) PCT Pub. No.: WO2017/102820
PCT Pub. Date: Jun. 22, 2017

(65) Prior Publication Data
US 2018/0371135 A1    Dec. 27, 2018

(30) Foreign Application Priority Data
Dec. 14, 2015 (EP) .................... 15199930

(51) Int. Cl.
| C08F 214/26 | (2006.01) |
| C08F 259/08 | (2006.01) |
| C08F 2/38 | (2006.01) |
| C08F 2/24 | (2006.01) |
| C08F 214/22 | (2006.01) |

(52) U.S. Cl.
CPC ............ *C08F 214/262* (2013.01); *C08F 2/24* (2013.01); *C08F 2/38* (2013.01); *C08F 214/222* (2013.01); *C08F 259/08* (2013.01); *C08F 2500/02* (2013.01); *C08F 2500/03* (2013.01); *C08F 2500/21* (2013.01); *C08F 2800/20* (2013.01)

(58) Field of Classification Search
CPC .................................................. C08F 259/08
See application file for complete search history.

(56) References Cited

U.S. PATENT DOCUMENTS

| 4,243,770 A | 1/1981 | Tatemoto et al. |
| 4,943,622 A | 7/1990 | Naraki et al. |
| 5,285,002 A | 2/1994 | Grootaert |
| 5,869,577 A * | 2/1999 | Aihara ................ C08F 214/22 525/243 |
| 6,509,429 B1 * | 1/2003 | Kitaichi ................ C08F 14/18 524/458 |
| 8,877,870 B2 * | 11/2014 | Funaki ................ C08F 214/26 525/326.2 |
| 2007/0015864 A1 | 1/2007 | Hintzer et al. |
| 2007/0015865 A1 | 1/2007 | Hintzer et al. |
| 2007/0015866 A1 | 1/2007 | Hintzer et al. |
| 2007/0025902 A1 | 2/2007 | Hintzer et al. |
| 2012/0108756 A1 * | 5/2012 | Komatsu ............... C08F 259/08 525/244 |
| 2013/0197163 A1 * | 8/2013 | Apostolo ............. C08F 214/22 525/326.2 |

FOREIGN PATENT DOCUMENTS

| EP | 661304 A1 | 7/1995 | |
| EP | 1304341 A2 * | 4/2003 | ............ C08F 214/18 |
| WO | 2006/068923 A2 | 6/2006 | |
| WO | 2010003929 A1 | 1/2010 | |
| WO | 2011073344 A1 | 6/2011 | |
| WO | 2012150253 A1 | 11/2012 | |

* cited by examiner

*Primary Examiner* — Nicole M. Buie-Hatcher
(74) *Attorney, Agent, or Firm* — Osha Bergman Watanabe & Burton LLP

(57) ABSTRACT

The invention pertains to a method for manufacturing a fluoroelastomer (A), wherein fluoroelastomer (A) is a (per) fluoroelastomer, where such method includes
(a): polymerizing in an aqueous emulsion in the presence of a surfactant by feeding the following ingredients into a first reactor:
(i) a monomer mixture (M1) comprising at least one monomer (F), wherein monomer (F) is a fluoromonomer,
(ii) at least one iodinated and/or brominated chain-transfer agent(s),
(iii) at least one branching agent possessing at least two ethylenic unsaturations; and
(iv) at least one radical initiator,
so as to obtain a pre-polymer latex (P);
(b): recovering latex (P) from the first reactor and storing the recovered latex (P) in a storage tank;
(c): feeding the recovered latex (P) from the storage tank into a second reactor;
(d): polymerizing in the second reactor at least a second monomer mixture (M2) comprising at least one monomer (F) in the presence of a radical initiator, so as to obtain a final latex (F); and
(d): recovering (per)fluoroelastomer from latex (F).

20 Claims, No Drawings

METHOD OF MANUFACTURING FLUOROELASTOMERS

CROSS-REFERENCE TO RELATED APPLICATION

This application is a U.S. national stage entry under 35 U.S.C. § 371 of International Application No. PCT/EP2016/080956 filed Dec. 14, 2016, which claims priority to European application No. 15199930.7, filed Dec. 14, 2015. The entire contents of these applications are explicitly incorporated herein by this reference.

TECHNICAL FIELD

The invention pertains to a method for the manufacture of (per)fluoroelastomers.

BACKGROUND ART

Vulcanized (per)fluoroelastomers are materials with excellent heat-resistance and chemical-resistance characteristics, which are generally used in the manufacture of technical articles such as sealing parts, pipes, oil seals and O-rings in which the leaktightness, the mechanical properties and the resistance to substances such as mineral oils, hydraulic fluids, solvents or chemical agents of diverse nature must be ensured over a wide range of working temperatures, from low to high temperatures.

For ensuring compliance with all these requirements, (per)fluoroelastomers are recognized to be endowed with very complex molecular structures, including controls in branching, in chain ends, in nature, distribution in the chain and type of cure-sites: these structural requirements are achieved following complex polymerization recipes and procedures, notably necessitating polymerizing required monomers in controlled pressure conditions, in controlled aqueous media, in the presence of several modifiers/adjuvants, and notably with controlled metering of all required ingredients.

Hence, reactor vessels which are designed for ensuring such controlled polymerization reactions are pressure vessel equipped with multiple reagent inlets, multiple flow controls, wherein each of the parts is such to resist corrosion by HF/fluorides which may be formed during polymerization. Significant capital expenditures are hence needed for providing a plant layout, and more specifically, a reactor system enabling manufacture of (per)fluoroelastomers.

The present invention hence addresses the problem of providing (per)fluoroelastomers of complex microstructure, providing a method which minimize the cost of equipment's at given throughput.

SUMMARY OF INVENTION

The invention thus concerns a method for manufacturing a (per)fluoroelastomer [fluoroelastomer (A)] comprising the following steps:
step (a): polymerizing in an aqueous emulsion in the presence of a surfactant by feeding in a first reactor comprising feeding the following ingredients:
(i) a monomer mixture [mixture (M1)] comprising at least one fluoromonomer [monomer (F)]
(ii) at least one iodinated and/or brominated chain-transfer agent(s),
(iii) at least one branching agent possessing at least two ethylenic unsaturations; and
(iv) at least one radical initiator,
so as to obtain a pre-polymer latex [latex (P)];
step (b): recovering the said latex (P) from the said first reactor and storing the same in a storage tank; and
step (c): feeding the said latex (P) from the said storage tank to a second reactor;
step (d): polymerizing in the said second reactor at least a second monomer mixture [mixture (M2)] comprising at least one monomer (F) in the presence of a radical initiator, so as to obtain a final latex [latex (F)]; and
step (e): recovering the fluoroelastomer (A) from the said latex (F).

The Applicant has found that complex molecular structures can be obtained in this multistep process, which necessitate of a complex reactor vessel solely for the manufacture of a pre-polymer, by introducing all modifiers (chain transfer agent, branching agent . . . ) in a pre-polymer latex, which can be stored indefinitely in appropriate conditions, and which can be further grown by restarting polymerization until achievement of target molecular weight/conversion in a second polymerization step in a basic pressure vessel, obtaining in this manner a material which has substantially same microstructure, and more importantly, substantially same performances/properties, of a fluoroelastomer which has been entirely manufactured in a complex reactor. For a given throughput, this solution is significantly beneficial for lowering equipment cost.

For the purposes of this invention, the term "(per)fluoroelastomer" [fluoroelastomer (A)] is intended to designate a fluoropolymer resin serving as a base constituent for obtaining a true elastomer, said fluoropolymer resin comprising more than 10% wt, preferably more than 30% wt, of recurring units derived from at least one ethylenically unsaturated monomer comprising at least one fluorine atom (hereafter, (per)fluorinated monomer) and, optionally, recurring units derived from at least one ethylenically unsaturated monomer free from fluorine atom (hereafter, hydrogenated monomer).

True elastomers are defined by the ASTM, Special Technical Bulletin, No. 184 standard as materials capable of being stretched, at room temperature, to twice their intrinsic length and which, once they have been released after holding them under tension for 5 minutes, return to within 10% of their initial length in the same time.

Step (a) comprises polymerizing by feeding a first monomer mixture (M1), which comprises at least one fluoromonomer. Monomer mixtures comprising more than one fluoromonomer are generally employed in the method of the present invention.

The expression "fluoromonomer" or monomer (F) is used herein according to its usual meaning, that is to say for designating an ethylenically unsaturated monomer comprising at least one fluorine atom.

The monomer (F) is selected generally from the group consisting of:
$C_2$-$C_8$ perfluoroolefins, such as tetrafluoroethylene (TFE), hexafluoropropene (HFP);
$C_2$-$C_8$ hydrogen-containing fluoroolefins, such as vinyl fluoride, 1,2-difluoroethylene, vinylidene fluoride (VDF), trifluoroethylene (TrFE) pentafluoropropylene, and hexafluoroisobutylene (HFIB);
(per)fluoroalkylethylenes complying with formula $CH_2=CH-R_{f0}$, in which $R_{f0}$ is a $C_1$-$C_6$ (per)fluoroalkyl or a $C_1$-$C_6$ (per)fluorooxyalkyl having one or more ether groups;

chloro- and/or bromo- and/or iodo-$C_2$-$C_6$ fluoroolefins, like chlorotrifluoroethylene (CTFE);

fluoroalkylvinylethers complying with formula $CF_2=CFOR_{f1}$ in which $R_{f1}$ is a $C_1$-$C_6$ fluoro- or perfluoroalkyl, e.g. —$CF_3$, —$C_2F_5$, —$C_3F_7$;

hydrofluoroalkylvinylethers complying with formula $CH_2=CFOR_{f1}$ in which $R_{f1}$ is a $C_1$-$C_6$ fluoro- or perfluoroalkyl, e.g. —$CF_3$, —$C_2F_5$, —$C_3F_7$;

fluoro-oxyalkylvinylethers complying with formula $CF_2=CFOX_0$, in which $X_0$ is a $C_1$-$C_{12}$ oxyalkyl, or a $C_1$-$C_{12}$ (per)fluorooxyalkyl having one or more ether groups, like perfluoro-2-propoxy-propyl;

fluoroalkyl-methoxy-vinylethers complying with formula $CF_2=CFOCF_2OR_{f2}$ in which $R_{f2}$ is a $C_1$-$C_6$ fluoro- or perfluoroalkyl, e.g. —$CF_3$, —$C_2F_5$, —$C_3F_7$ or a $C_1$-$C_6$ (per)fluorooxyalkyl having one or more ether groups, like —$C_2F_5$—O—$CF_3$;

functional fluoro-alkylvinylethers complying with formula $CF_2=CFOY_0$, in which $Y_0$ is a $C_1$-$C_{12}$ alkyl or (per)fluoroalkyl, or a $C_1$-$C_{12}$ oxyalkyl or a $C_1$-$C_{12}$ (per)fluorooxyalkyl, said $Y_0$ group comprising a carboxylic or sulfonic acid group, in its acid, acid halide or salt form;

fluorodioxoles, of formula:

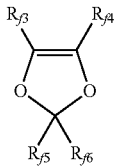

wherein each of $R_{f3}$, $R_{f4}$, $R_{f5}$, $R_{f6}$, equal or different each other, is independently a fluorine atom, a $C_1$-$C_6$ fluoro- or per(halo)fluoroalkyl, optionally comprising one or more oxygen atom, e.g. —$CF_3$, —$C_2F_5$, —$C_3F_7$, —$OCF_3$, —$OCF_2OF_2OCF_3$.

The mixture (M1) may comprise at least one additional monomer different from monomer (F), that is to say a monomer free from fluorine, otherwise generally referred to as a hydrogenated monomer. Examples of hydrogenated monomers are notably $C_2$-$C_8$ non-fluorinated olefins (Ol), in particular $C_2$-$C_8$ non-fluorinated alpha-olefins (Ol), including ethylene, propylene, 1-butene; diene monomers; styrene monomers; with alpha-olefins, as above detailed, being typically used.

For the manufacture of the fluoroelastomer (A), the mixture (M1) generally comprises a combination of at least two monomers (F), as above detailed.

Particular combinations of monomers (F) which can be used as mixtures (M1) in the method of the present invention, in particular for manufacturing fluoroelastomers, are preferably:

(1) vinylidene fluoride (VDF) containing monomers mixtures, in which VDF is mixed with at least one comonomer different from VDF and selected from the group consisting of:

(a) $C_2$-$C_8$ perfluoroolefins, such as tetrafluoroethylene (TFE), hexafluoropropylene (HFP);

(b) hydrogen-containing $C_2$-$C_8$ fluoro-olefins, such as vinyl fluoride (VF), trifluoroethylene (TrFE), hexafluoroisobutylene (HFIB), perfluoroalkyl ethylenes of formula $CH_2=CH-R_f$, wherein $R_f$ is a $C_1$-$C_6$ perfluoroalkyl group;

(c) $C_2$-$C_8$ chloro and/or bromo and/or iodo-fluoroolefins such as chlorotrifluoroethylene (CTFE);

(d) (per)fluoroalkylvinylethers (PAVE) of formula $CF_2=CFOR_f$, wherein $R_f$ is a $C_1$-$C_6$ (per)fluoroalkyl group, e.g. $CF_3$, $C_2F_5$, $C_3F_7$;

(e) (per)fluoro-oxy-alkylvinylethers of formula $CF_2=CFOX$, wherein X is a $C_1$-$C_{12}$ ((per)fluoro)-oxyalkyl comprising catenary oxygen atoms, e.g. the perfluoro-2-propoxypropyl group;

(f) (per)fluorodioxoles having formula:

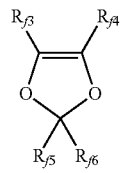

wherein $R_{f3}$, $R_{f4}$, $R_{f5}$, $R_{f6}$, equal or different from each other, are independently selected among fluorine atoms and $C_1$-$C_6$ (per)fluoroalkyl groups, optionally comprising one or more than one oxygen atom, such as notably —$CF_3$, —$C_2F_5$, —$C_3F_7$, —$OCF_3$, —$OCF_2CF_2OCF_3$; preferably, perfluorodioxoles;

(g) (per)fluoro-methoxy-vinylethers (MOVE, hereinafter) having formula:

$$CFX_2=CX_2OCF_2OR''_f$$

wherein $R''_f$ is selected among $C_1$-$C_6$ (per)fluoroalkyls, linear or branched; $C_5$-$C_6$ cyclic (per)fluoroalkyls; and $C_2$-$C_6$ (per)fluorooxyalkyls, linear or branched, comprising from 1 to 3 catenary oxygen atoms, and $X_2$=F, H; preferably $X_2$ is F and $R''_f$ is —$CF_2CF_3$ (MOVE1); —$CF_2CF_2OCF_3$ (MOVE2); or —$CF_3$ (MOVE3);

(h) $C_2$-$C_8$ non-fluorinated olefins (Ol), for example ethylene and propylene;

(i) ethylenically unsaturated compounds comprising nitrile (—CN) groups, possibly (per)fluorinated; and (2) tetrafluoroethylene (TFE) containing monomers mixtures, in which TFE is mixed with at least one comonomer different from TFE and selected from the group consisting of monomers of classes (a), (c), (d), (e), (f), (g), and (i), as above detailed.

The following mixtures (M1) can be advantageously used (in mol %):

(i) vinylidene fluoride (VDF) 35-85%, hexafluoropropene (HFP) 10-45%, tetrafluoroethylene (TFE) 0-30%, perfluoroalkyl vinyl ethers (PAVE) 0-15%;

(ii) vinylidene fluoride (VDF) 50-80%, perfluoroalkyl vinyl ethers (PAVE) 5-50%, tetrafluoroethylene (TFE) 0-20%;

(iii) vinylidene fluoride (VDF) 20-30%, $C_2$-$C_8$ non-fluorinated olefins (Ol) 10-30%, hexafluoropropene (HFP) and/or perfluoroalkyl vinyl ethers (PAVE) 18-27%, tetrafluoroethylene (TFE) 10-30;

(iv) tetrafluoroethylene (TFE) 50-80%, perfluoroalkyl vinyl ethers (PAVE) 20-50%;

(v) tetrafluoroethylene (TFE) 45-65%, $C_2$-$C_8$ non-fluorinated olefins (Ol) 20-55%, vinylidene fluoride 0-30%;

(vi) tetrafluoroethylene (TFE) 32-60% mol %, $C_2$-$C_8$ non-fluorinated olefins (Ol) 10-40%, perfluoroalkyl vinyl ethers (PAVE) 20-40%, fluorovinyl ethers (MOVE) 0-30;

(vii) tetrafluoroethylene (TFE) 33-75%, perfluoroalkyl vinyl ethers (PAVE) 15-45%, vinylidene fluoride (VDF) 5-30%, hexafluoropropene HFP 0-30;

(viii) vinylidene fluoride (VDF) 35-85%, fluorovinyl ethers (MOVE) 5-40%, perfluoroalkyl vinyl ethers (PAVE) 0-30%, tetrafluoroethylene (TFE) 0-40%, hexafluoropropene (HFP) 0-30;

(ix) tetrafluoroethylene (TFE) 20-70%, fluorovinyl ethers (MOVE) 30-80%, perfluoroalkyl vinyl ethers (PAVE) 0-50%.

In step (a), monomers mixture (M1) is generally fed continuously, i.e. in a constant manner during the polymerization until reaching the targeted converted/polymerized amount of the said mixture (M1), so as to maintain a constant pressure in the rector.

As said, step (a) comprises polymerizing the mixture (M1) in an aqueous emulsion in the presence of a surfactant.

The surfactant used in the method of the invention is generally a fluorinated surfactant. More specifically, fluorinated surfactant [surfactant (FS)] of formula:

$$R_{fS}(X^-)_j(M^+)_j$$

wherein $R_{fS}$ is a $C_3$-$C_{30}$ (per)fluoroalkyl chain, which can possibly be linear, cyclic of branched, a $C_3$-$C_{30}$ (per)fluoro(poly)oxyalkylenic chain, which can possibly be linear, cyclic of branched, $X^-$ is $-COO^-$, $-PO_3^-$ or $-SO_3^-$, $M^+$ is selected from $H^+$, $NH_4^+$, an alkaline metal ion and j can be 1 or 2, can be used.

As non limitative example of surfactants (FS), mention may be made of ammonium and/or sodium perfluorocarboxylates, and/or (per)fluoropolyoxyalkylenes having one or more carboxylic end groups.

Other examples of fluorinated surfactants are (per)fluorooxyalkylenic surfactants described in US 2007015864 (3M INNOVATIVE PROPERTIES) Jan. 8, 2007, US 2007015865 (3M INNOVATIVE PROPERTIES CO) Jan. 18, 2007, US 2007015866 (3M INNOVATIVE PROPERTIES CO) Jan. 18, 2007, US 2007025902 (3M INNOVATIVE PROPERTIES CO) Feb. 1, 2007.

More preferably, the surfactant (FS) selected from the group consisting of:

$CF_3(CF_2)_{n1}COOM'$, in which $n_1$ is an integer ranging from 4 to 10, preferably from 5 to 7, and more preferably being equal to 6; M' represents H, $NH_4$, Na, Li or K, preferably $NH_4$;

$T(C_3F_6O)_{n0}(CFXO)_{m0}CF_2COOM''$ [formula ($FS_1$)], in which T represents Cl or a perfluoroalkoxyde group of formula $C_kF_{2k+1}O$ with k is an integer from 1 to 3, one F atom being optionally substituted by a Cl atom; $n_0$ is an integer ranging from 1 to 6; $m_0$ is an integer ranging from 0 to 6; M'' represents H, $NH_4$, Na, Li or K; X represents F or $CF_3$;

$F-(CF_2-CF_2)_{n2}-CH_2-CH_2-RO_3M'''$, in which R is P or S, preferably S, M''' represents H, $NH_4$, Na, Li or K, preferably H; $n_2$ is an integer ranging from 2 to 5, preferably $n_2=3$;

A-$R_f$-B bifunctional fluorinated surfactants, in which A and B, equal to or different from each other, are $-(O)_pCFX-COOM^*$; $M^*$ represents H, $NH_4$, Na, Li or K, preferably $M^*$ represents $NH_4$; X=F or $CF_3$; p is an integer equal to 0 or 1; $R_f$ is a linear or branched perfluoroalkyl chain, or a (per)fluoropolyether chain such that the number average molecular weight of A-$R_f$-B is in the range 300 to 3,000, preferably from 500 to 2,000;

$R'_f-O-(CF_2)_r-O-L-COOM'$, wherein $R'_f$ is a linear or branched perfluoroalkyl chain, optionally comprising catenary oxygen atoms, M' is H, $NH_4$, Na, Li or K, preferably M' represents $NH_4$; r is 1 to 3; L is a bivalent fluorinated bridging group, preferably $CF_2CF_2-$ or CFX—, X=F or $CF_3$;

$R''_f-(OCF_2)_u-O-(CF_2)_v-COOM''$, wherein $R''_f$ is a linear or branched perfluoroalkyl chain, optionally comprising catenary oxygen atoms, M'' is H, $NH_4$, Na, Li or K, preferably M'' represents $NH_4$; u and v are integers from 1 to 3;

$R'''_f-(O)_t-CHQ-L-COOM'''$, wherein $R'''_f$ is a linear or branched perfluoroalkyl chain, optionally comprising catenary oxygen atoms, Q=F or $CF_3$, t is 0 or 1, M''' is H, $NH_4$, Na, Li or K, preferably M''' is $NH_4$; L is a bivalent fluorinated bridging group, preferably $CF_2CF_2-$ or CFX—, X=F or $CF_3$;

cyclic fluorocompounds of the following formula (I):

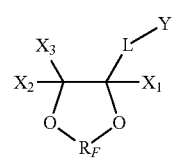

(I)

wherein $X_1$, $X_2$, $X_3$, equal or different from each other are independently selected among H, F, and $C_{1-6}$ (per)fluoroalkyl groups, optionally comprising one or more catenary or non-catenary oxygen atoms; L represents a bond or a divalent group, in particular a divalent fluorinated aliphatic group; $R_F$ is a divalent fluorinated $C_{1-3}$ bridging group; Y is a hydrophilic function selected from the group consisting of those of formulae:

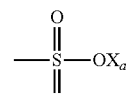

(1'')

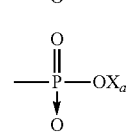

(2'')

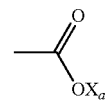

(3'')

wherein $X_a$ is H, a monovalent metal (preferably an alkaline metal) or an ammonium group of formula $N(R'_n)_4$, wherein $R'_n$, equal or different at each occurrence, represents a hydrogen atom or a $C_{1-6}$ hydrocarbon group (preferably an alkyl group); these cyclic fluorocompounds being notably described in WO 2010/003929, the content of which is hereby incorporated by reference;

and mixtures thereof.

In certain particularly preferred embodiments of the method of the invention, the aqueous emulsion of step (a) further advantageously includes an additional non-functional fluorinated fluid (i.e. a non-reactive fluoro-containing fluid).

This technique is particularly advantageous as the addition of certain particular non-functional fluorinated fluid(s) [fluid (F)] can provide for an emulsion comprising dispersed droplets of said fluid having an average size of preferably less than 50 nm, more preferably of less than 40 nm, even more preferably of less than 30 nm. Said nanometric size of droplets is particularly advantageous in that it ensure higher polymerization rates and small particles of pre-polymer in the latex (P).

Said non-functional fluorinated fluid which can be used according to this embodiment are preferably (per)fluoropolyethers comprising recurring units (R1), said recurring units comprising at least one ether linkage in the main chain and at least one fluorine atom (fluoropolyoxyalkene chain), and possessing fluoro(halo)alkyl end groups.

Preferably the recurring units R1 of the (per)fluoropolyether are selected from the group consisting of:
(I) —CFX—O—, wherein X is —F or —CF$_3$; and
(II) —CF$_2$—CFX—O—, wherein X is —F or —CF$_3$; and
(III) —CF$_2$—CF$_2$—CF$_2$—O—; and
(IV) —CF$_2$—CF$_2$—CF$_2$—CF$_2$—O—; and
(V) —(CF$_2$)$_j$—CFZ—O— wherein j is an integer chosen from 0 and 1 and Z is a fluoropolyoxyalkene chain comprising from 1 to 10 recurring units chosen among the classes (I) to (IV) here above; and mixtures thereof.

Should the (per)fluoropolyether comprise recurring units R1 of different types, advantageously said recurring units are randomly distributed along the fluoropolyoxyalkene chain.

Preferably the (per)fluoropolyether is a compound complying with formula (I-p) here below:

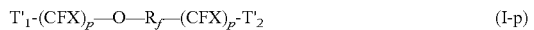

$T'_1\text{-}(CFX)_p\text{—O—}R_f\text{—}(CFX)_{p'}\text{-}T'_2$   (I-p)

wherein:
each of X is independently F or CF$_3$;
p and p', equal or different each other, are integers from 0 to 3;
R$_f$ is a fluoropolyoxyalkene chain comprising repeating units R°, said repeating units being chosen among the group consisting of:
(i) —CFXO—, wherein X is F or CF$_3$,
(ii) —CF$_2$CFXO—, wherein X is F or CF$_3$,
(iii) —CF$_2$CF$_2$CF$_2$O—,
(iv) —CF$_2$CF$_2$CF$_2$CF$_2$O—,
(v) —(CF$_2$)$_j$—CFZ—O— wherein j is an integer chosen from 0 and 1 and Z is a group of general formula —OR$_f'$T$_3$, wherein R$_f'$ is a fluoropolyoxyalkene chain comprising a number of repeating units from 0 to 10, said recurring units being chosen among the followings: —CFXO—, —CF$_2$CFXO—, —CF$_2$CF$_2$CF$_2$O—, —CF$_2$CF$_2$CF$_2$CF$_2$O—, with each of each of X being independently F or CF$_3$; and T$_3$ is a C$_1$-C$_3$ perfluoroalkyl group, and mixtures thereof;

T'$_1$ and T'$_2$, the same or different each other, are H, halogen atoms, C$_1$-C$_3$ fluoroalkyl groups, optionally comprising one or more H or halogen atoms different from fluorine.

Particularly preferred embodiments are those wherein the aqueous emulsion of step (a) comprises at least one surfactant (FS), as above detailed, and at least one fluid (F), as above detailed. More specifically, embodiments which are preferred because of their ability to provide for improved reaction rate and for a latex (P) comprising particles of nanometric size are those wherein the aqueous emulsion of step (a) includes:
at least one surfactant (FS) of formula (FS$_1$):
T(C$_3$F$_6$O)$_{n0}$(CFXO)$_{m0}$CF$_2$COOM", as above detailed; and
at least one fluid (F) of formula (I-p) T$_1$-(CFX)$_p$—O—R$_f$—(CFX)$_{p'}$-T$_2$ (I-p) as above detailed.

As mentioned above, the first polymerizing step (step (a)) to provide the latex (P) notably comprises feeding at least a chain transfer agent, as above detailed.

Typically, the iodinated and/or brominated chain-transfer agent(s) are those of formula R$_f$(I)$_x$(Br)$_y$, in which R$_f$ is a (per)fluoroalkyl or a (per)fluorochloroalkyl containing from 1 to 8 carbon atoms, while x and y are integers between 0 and 2, with $1 \le x+y \le 2$ (see, for example, U.S. Pat. No. 4,243,770 (DAIKIN IND LTD) Jan. 6, 1981 and U.S. Pat. No. 4,943,622 (NIPPON MEKTRON KK) Jul. 24, 1990).

A particularly effective class of transfer agents is represented by alpha, omega-diiodofluoroalkanes having 1 to 8 carbon atoms, and more specifically, compounds of formula I—R"$_f$—I, wherein R"$_f$ is a divalent perfluoroalkylene group or containing from 1 to 8 carbon atoms.

The amount of iodinated and/or brominated chain-transfer agent(s) fed during Step (a) is adjusted in order to tune the molecular weight target of the pre-polymer and the amount of iodinated and/or brominated cure sites comprised therein. Generally, the said amount is of advantageously at least 1.0 weight part per 100 weight parts of pre-polymer manufactured in Step (a) and/or is of advantageously at most 4.0 weight parts per 100 weight parts of pre-polymer manufactured in Step (a).

Step (a) further notably comprises feeding at least one branching agent possessing at least two ethylenic unsaturations.

Generally, the branching agent is fed progressively during the polymerization; it may be fed continuously or step-wise, i.e. by addition of pre-defined amounts at each pre-defined progress in conversion of monomer mixture (M1).

This branching agent is generally a bis-olefin [bis-olefin (OF)] having general formula:

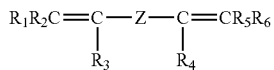

$R_1R_2C=C\underset{R_3}{|}-Z-\underset{R_4}{|}C=CR_5R_6$ wherein R$_1$, R$_2$, R$_3$, R$_4$, R$_5$ and R$_6$, equal or different from each other, are H or C$_1$-C$_5$ alkyl; Z is a linear or branched C$_1$-C$_{18}$ alkylene or cycloalkylene radical, optionally containing oxygen atoms, preferably at least partially fluorinated, or a (per)fluoropolyoxyalkylene radical, e.g. as described in EP 661304 A (AUSIMONT SPA) May 7, 1995.

The bis-olefin (OF) is preferably selected from the group consisting of those complying with formulae (OF-1), (OF-2) and (OF-3):

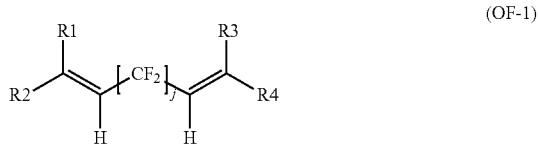

(OF-1)

wherein j is an integer between 2 and 10, preferably between 4 and 8, and R1, R2, R3, R4, equal or different from each other, are H, F or C$_{1-5}$ alkyl or (per)fluoroalkyl group;

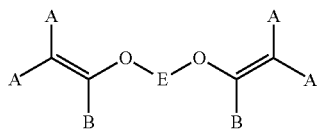

(OF-2)

wherein each of A, equal or different from each other and at each occurrence, is independently selected from F, Cl, and H; each of B, equal or different from each other and at each occurrence, is independently selected from F, Cl, H and $OR_B$, wherein $R_B$ is a branched or straight chain alkyl radical which can be partially, substantially or completely fluorinated or chlorinated; E is a divalent group having 2 to 10 carbon atom, optionally fluorinated, which may be inserted with ether linkages; preferably E is a $(CF_2)_m$— group, with m being an integer from 3 to 5; a preferred bis-olefin of (OF-2) type is $F_2C=CF-O-(CF_2)_5-O-CF=CF_2$.

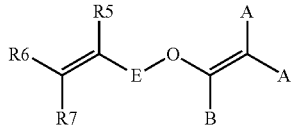

(OF-3)

wherein E, A and B have the same meaning as above defined; R5, R6, R7, equal or different from each other, are H, F or $C_{1-5}$ alkyl or (per)fluoroalkyl group.

A particularly preferred bis-olefin (OF) is a bis-olefin (OF-1), as above detailed, wherein all of R1, R2, R3, R4 are H, and wherein j is an integer from 2 to 8.

The amount of branching agent possessing at least two ethylenic unsaturations fed in Step (a) is generally of at most 1% wt, preferably at most 0.5% wt, more preferably at most 0.3% wt, with respect to the total weight of pre-polymer obtained in Step (a). Lower boundary is not particularly critical and is generally adjusted in order to ensure a sufficiently branched structure to provide more than two iodinated and/or brominated end chain per molecule of pre-polymer.

Step (a) further comprises feeding at least one radical initiator. The radical initiator includes any of the initiators known for initiating a free radical polymerization of fluorinated monomers. Suitable initiators include peroxides and azo compounds and redox based initiators. Specific examples of peroxide initiators include hydrogen peroxide, sodium or barium peroxide, diacylperoxides such as diacetylperoxide, disuccinyl peroxide, dipropionylperoxide, dibutyrylperoxide, dibenzoylperoxide, benzoylacetylperoxide, diglutaric acid peroxide and dilaurylperoxide, and further per-acids and salts thereof such as e.g. ammonium, sodium or potassium salts. Examples of per-acids include peracetic acid. Esters of the peracid can be used as well and examples thereof include tert.-butylperoxyacetate and tert.-butylperoxypivalate. Examples of inorganic include for example ammonium-alkali- or earth alkali salts of persulfates, permanganic or manganic acid or manganic acids. A persulfate initiator, e.g. ammonium persulfate (APS), can be used on its own or may be used in combination with a reducing agent. Suitable reducing agents include bisulfites such as for example ammonium bisulfite or sodium metabisulfite, thiosulfates such as for example ammonium, potassium or sodium thiosulfate, hydrazines, azodicarboxylates and azodicarboxyldiamide (ADA). Further reducing agents that may be used include sodium formaldehyde sulfoxylate (Rongalit) or fluoroalkyl sulfinates, e.g. as disclosed in U.S. Pat. No. 5,285,002. The reducing agent typically reduces the half-life time of the persulfate initiator. Additionally, a metal salt catalyst such as for example copper, iron or silver salts may be added.

The initiator can be metered in step (a) in one shot at the onset of the polymerization, or can be added continuously or step-wise; embodiments wherein the initiator is a persulfate (e.g. ammonium persulfate) generally provide for the said persulfate to be fed in its entirety at the onset of the polymerization.

The aqueous emulsion polymerization of step (a) may be carried out at a temperature between 10 to 150° C., preferably 20° C. to 110° C., preferably of 50 to 90° C. and the pressure is typically between 2 and 30 bar, in particular 15 to 30 bar.

As mentioned above, Step (a) comprises feeding (i) mixture (M1), (ii) iodinated and/or brominated chain-transfer agent(s), (iii) branching agent possessing; and (iv) radical initiator; generally, all these ingredients are fed to the first reactor each from a separated inlet metering port.

Step (a) provides for a pre-polymer latex [latex (P)] which comprises hence particles of the so polymerized pre-polymer dispersed in an aqueous emulsion comprising the surfactant, as above detailed.

The said so polymerized pre-polymer is generally a low molecular weight fluoropolymer having a branched structure and comprising iodinated and/or brominated chain ends, because of the use of branching agent and chain transfer agent, as above detailed.

The pre-polymer obtained from Step (a) generally has a number-averaged molecular weight of advantageously at least 1000, preferably at least 5000, more preferably at least 10000 and/or advantageously at most 40000, preferably at most 30000, more preferably at most 20000.

The number average molecular weight ($M_n$) is:

$$M_n = \frac{\sum M_i \cdot N_i}{\sum N_i},$$

which can be notably determined by gel permeation chromatography (GPC).

Other molecular parameters which can be notably determined by GPC are the weight average molecular weight ($M_w$):

$$M_w = \frac{\sum M_i^2 \cdot N_i}{\sum M_i \cdot N_i},$$

and the polydispersity index (PDI), which is hereby expressed as the ratio of weight average molecular weight ($M_w$) to number average molecular weight ($M_n$).

The pre-polymer obtained from Step (a) generally has a PDI of advantageously at least 1.2, preferably at least 1.3 and more preferably at least 1.5 and/or of advantageously at most 3.5, preferably at most 3.0 and more preferably at most 2.8.

The pre-polymer obtained from Step (a) generally has a iodine and/or bromine content of advantageously at least 0.5%, preferably at least 1.0% wt, more preferably at least 1.2% wt, with respect to the weight of the pre-polymer and/or of advantageously at most 3.0%, preferably at most 2.5% wt, more preferably at most 2.0% wt, with respect to the weight of the pre-polymer.

In step (b), the said latex (P) is recovered from the said first reactor; this generally implies cooling the same to room temperature in the said first reactor, and venting off from the same residual amounts of gaseous unreacted monomers. Any storage tank having suitable corrosion resistance can be used. Storage time is not particularly limited; storage tank comprising latex (P) can be moved within different locations so as to enable transfer of the latex (P) from different sections of same plant, or from a plant to another plant. Generally, a storage time of at least 1 hour, preferably of at least 1 day lapses before step (c), as below detailed.

While use is made of the expression "storage tank" in the singular, the present invention encompasses embodiment's wherein the latex (P) is stored in a plurality of storage tanks, or is moved, during storage time, from a first storage tank (or from a first plurality of storage tanks) to a second storage tank (or a second plurality of storage tanks), and/or to any further storage tank (or plurality thereof).

In step (c), the said latex (P) is fed from the said storage tank to a second reactor.

The second reactor is generally different from the first reactor, although the process may be carried out using reactors of same type and/or feeding back to first reactor.

Generally, nevertheless, the second step is carried out in a second reactor which is different from the first reactor. In particular, the second reactor, while equipped for the introduction of the latex (P), of radical initiator and of monomer mixture (M2), is not equipped for metering branching agent and/or for metering iodinated and/or brominated chain transfer agent.

In step (d) a second monomer mixture [mixture (M2)] comprising at least one monomer (F) is polymerized in the presence of a radical initiator, so as to obtain final latex [latex (F)], from which fluoroelastomer (A) is recovered.

The Applicant has surprisingly found that, despite interruption of polymerization and storage of pre-polymer, the reaction can be re-initiated for re-starting chain growth. Further, despite refraining from feeding iodinated and/or brominated chain transfer agent and branching agent in second reactor, it has been demonstrated that it is possible matching with appropriate recipes of pre-polymer and second polymerizations step, properties and structure of (per) fluoroelastomers of similar monomeric compositions, manufactured in one step.

The features of mixture (M2) are those described herein above for mixture (M1). The mixture (M2) may be equal (both in components and related concentrations) to mixture (M1) as above detailed, or may differ from mixture (M1) in relation to the components thereof and/or their respective amounts.

The radical initiator used in step (d) possesses the same features as described above in relation to the radical initiator used in step (a). Generally same initiator can be used in both steps, without this being mandatory.

Similarly as per step (a), the aqueous emulsion polymerization of step (d) may be carried out at a temperature between 10 to 150° C., preferably 20° C. to 110° C., preferably of 50 to 90° C. and the pressure is typically between 2 and 30 bar, in particular 15 to 30 bar.

Similarly as in step (a), monomers mixture (M2) can be continuously fed in step (d) so as to maintain a constant pressure.

Typically, in step (d), no branching agent is added.

Similarly, embodiments wherein in step (d) no iodinated and/or brominated chain transfer agent is added are preferred.

Yet, more preferably, no branching agent and no iodinated and/or brominated chain transfer agent are added in step (d).

The amount of mixture (M2) converted in Step (d) is not particularly limited; generally, the weight ratio between the amount of mixture (M2) converted in Step (d) (or in other terms, the chain growth/weight gain of fluoroelastomer (A) in latex (F)) and the amount of pre-polymer fed to the second reactor as latex (P) is generally of advantageously at least 2, preferably at least 3, more preferably at least 5 weight parts of mixture (M2) converted per weight part of pre-polymer, and/or advantageously at most 20, preferably at most 15 of mixture (M2) converted per weight part of pre-polymer.

In other terms, the weight fraction of fluoroelastomer (A) produced in Step (a) (or otherwise said, the weight fraction of pre-polymer) is generally less than 33% weight, preferably less than 25% weight, more preferably less than 18% weight, with respect to the total weight of fluoroelastomer (A).

By adjusting in this manner the weight ratio between pre-polymer manufactured by controlled polymerization technique in complex reactor comprising multiple feeding ports and the overall weight of fluoroelastomer (A) is advantageously possible to achieve high throughput of the dual reactors manufacturing train, while minimizing capital expenditure, as most of the material produced is obtained in a basic reactor tank, with simplified and cheaper layout.

In Step (e), the fluoroelastomer (A) can be recovered from the latex (F) using standard techniques. Coagulation technique which can be used includes coagulation by addition of electrolytes, freeze-taw coagulation, and coagulation under high shear. Generally, the fluoroelastomer is separated from the aqueous phase by any of filtration, decantation, centrifugation, and other traditional solid/liquid separation techniques.

Generally, recovery further involves drying the fluoroelastomer (A) for removal of residual moisture.

The fluoroelastomer (A) possesses a molecular weight higher that the pre-polymer obtained from Step (A).

More specifically, fluoroelastomer (A) possesses a number-averaged molecular weight of advantageously at least 40000, preferably at least 50000, more preferably at least 60000, even more preferably at least 80000; and/or of advantageously at most 150000, preferably at most 130000, more preferably at most 120000.

This chain growth may be or may be not associated to a broadening in the PDI, which will ranges from at least 1.5 to at most 9.0; nevertheless, chain growth can be suitably ensured to provide for fluoroelastomer (A) wherein the PDI is maintained at values of advantageously at most 3.5, preferably at most 3.0 and more preferably at most 2.8.

Because the chain growth in Step (d) is generally practiced in the absence of added iodinated and/or brominated chain transfer agent, the iodine and/or bromine content of the fluoroelastomer (A) is consequently decreased with respect to the iodine and/or bromine content of the pre-polymer.

Generally, hence, the iodine and/or bromine content is reduced consistently to the chain growth/weight gain achieved in Step (d). In other terms, the iodine and/or bromine content is reduced by a factor equal to the weight of fluoroelastomer (A) over the weight of pre-polymer obtained from Step (a).

The fluoroelastomer (A) obtained from Step (d) generally has a iodine and/or bromine content of advantageously at least 0.05%, preferably at least 0.1% wt, more preferably at least 0.15% wt, with respect to the weight of the fluoroelastomer (A) and/or of advantageously at most 1.5%, preferably at most 1.2% wt, more preferably at most 1.0% wt, with respect to the weight of the fluoroelastomer (A).

Similarly, because the chain growth in Step (d) is generally practiced in the absence of added branching agent, the branching agent content in the fluoroelastomer (A) is consequently decreased with respect to the branching agent content of the pre-polymer.

Generally, hence, the branching agent content is reduced consistently to the chain growth/weight gain achieved in Step (d). In other terms, the branching agent content is reduced by a factor equal to the weight of fluoroelastomer (A) over the weight of pre-polymer obtained from Step (a).

The fluoroelastomer (A) so obtained can be shaped into final parts and cross-linked using traditional curing and molding techniques.

Generally, the fluoroelastomer (A) is suitable for peroxide curing, i.e. is suitable for being cross-linked in the presence of a peroxide and a polyunsaturated cross-linking agent (e.g. triallylisocyanurate).

Should the disclosure of any of the patents, patent applications, and publications that are incorporated herein by reference conflict with the present description to the extent that it might render a term unclear, the present description shall take precedence.

The present invention will be now described in more detail with reference to the following examples, whose purpose is merely illustrative and not limitative of the scope of the invention

EXAMPLES

Example 1

Example 1a—Preparation of Pre-Polymer Latex

In a 10 liters reactor equipped with a mechanical stirrer operating at 545 rpm, 5.4 l of demineralized water and 175 ml of a microemulsion, previously obtained by mixing 38.5 ml of a perfluoropolyoxyalkylene having acidic end groups of formula: $CF_2ClO(CF_2—CF(CF_3)O)_n(CF_2O)_mCF_2COOH$, wherein n/m=10, having average molecular weight of 600, 24.6 ml of a 30% v/v $NH_4OH$ aqueous solution, 87.7 ml of demineralized water and 24.2 ml of GALDEN® D02 perfluoropolyether of formula: $CF_3O(CF_2CF(CF_3)O)_n(CF_2O)_mCF_3$ with n/m=20, having average molecular weight of 450, were introduced.

The reactor was heated and maintained at a set-point temperature of 80° C.; a mixture of vinylidene fluoride (VDF) (78.5% moles) and hexafluoropropene (HFP) (21.5% moles) was then added to reach a final pressure of 25 bar. Then 102 g of 1,4-diiodioperflurobutane ($C_4F_8I_2$) as chain transfer agent were introduced, and 2.0 g of ammonium persulfate (APS) as initiator were introduced. Pressure was maintained at set-point of 25 bar by continuous feeding of a gaseous mixture of vinylidene fluoride (VDF) (78.5% moles) and hexafluoropropene (HFP) (21.5% moles) up to a total of 3150 g. Simultaneously, 6.8 g of 6.8 g of $CH_2$=CH—$(CF_2)_6$—CH=$CH_2$ were fed to the reactor in a controlled manner following the consumption of monomers, by 20 identical step-wise additions at the onset of the polymerization and at each 5% increase in target conversion. Then the reactor was cooled, vented and the latex recovered and stored in a tank for duration of more than 1 day. A specimen of this pre-polymer was taken for analytical/mechanical determinations.

Example 1b—Preparation of Final Fluoroelastomer

In a 21 liters reactor equipped with a magnetic stirrer operating at 60 rpm, 12.9 l of demineralized water and 1776 g of latex produced in Example 1, having a solids content of about 36% wt, were introduced.

The reactor was heated and maintained at a set-point temperature of 80° C.; a mixture of vinylidene fluoride (VDF) (78.5% moles) and hexafluoropropene (HFP) (21.5% moles) was then added to reach a final pressure of 25 bar. 2.6 g of ammonium persulfate (APS) as initiator were then introduced. Pressure was maintained at set-point of 25 bar by continuous feeding of a gaseous mixture of vinylidene fluoride (VDF) (78.5% moles) and hexafluoropropene (HFP) (21.5% moles) up to a total of 4170 g. Then the reactor was cooled, vented and the latex recovered. The latex was coagulated by addition of aluminum sulphate; coagulated fluoroelastomer was separated from the aqueous phase, washed with demineralized water and dried in a convection oven at 90° C. for 16 hours.

Raw polymer characterization data are reported in Table 1 and 2.

Comparative Example 2

In a 10 liters reactor equipped with a mechanical stirrer operating at 545 rpm, 5.4 l of demineralized water and 40 ml of a microemulsion, previously obtained by mixing 8.8 ml of a perfluoropolyoxyalkylene having acidic end groups of formula: $CF_2ClO(CF_2—CF(CF_3)O)_n(CF_2O)_mCF_2COOH$, wherein n/m=10, having average molecular weight of 600, 5.6 ml of a 30% v/v $NH_4OH$ aqueous solution, 20.0 ml of demineralized water and 5.5 ml of GALDEN® D02 perfluoropolyether of formula: $CF_3O(CF_2CF(CF_3)O)_n(CF_2O)_mCF_3$ with n/m=20, having average molecular weight of 450, were introduced.

The reactor was heated and maintained at a set-point temperature of 80° C.; a mixture of vinylidene fluoride (VDF) (78.5% moles) and hexafluoropropene (HFP) (21.5% moles) was then added to reach a final pressure of 25 bar. Then 13.5 g of 1,4-diiodioperflurobutane ($C_4F_8I_2$) as chain transfer agent were introduced, and 2.0 g of ammonium persulfate (APS) as initiator were introduced. Pressure was maintained at set-point of 25 bar by continuous feeding of a gaseous mixture of vinylidene fluoride (VDF) (78.5% moles) and hexafluoropropene (HFP) (21.5% moles) up to a total of 3150 g. Moreover, 1.2 g of $CH_2$=CH—$(CF_2)_6$—CH=$CH_2$, fed in 20 equivalent portions, at the onset of the polymerization and then each 5% increase in conversion, were introduced. Then the reactor was cooled, vented and the latex recovered. The latex was treated with aluminum sulphate, separated from the aqueous phase, washed with demineralized water and dried in a convection oven at 90° C. for 16 hours. Raw polymer characterization data are reported in Table 1 and 2.

GPC Determinations

Fluoroelastomers were characterized by GPC using instrumentation and conditions as detailed in the Table 1 below, and relevant parameters were determined based on polystyrene standards, taking into account polymer/solvent Mark-Houwink parameters for relevant standard and for fluoroelastomers.

TABLE 6

| Mobile phase | Tetrahydrofuran (THF) |
|---|---|
| Flow rate | 1.0 mL/min |
| Temperature | 35° C. |
| Injection system | Autosampler mod. Waters 717plus |
| Injection volume | 200 mL |
| Pump | Waters mod. 515 HPLC |
| Column set | Precolumn + 4 Waters Styragel HR: $10^6$, $10^5$, $10^4$ and $10^3$ Å |
| Detector | Waters Refractive Index mod. 2414 |
| Software for data acquisition and processing | Waters Empower 3 |

TABLE 1

| Example N° | Reaction time min | Composition % mol VDF | Composition % mol HFP | Molecular weight distribution Mn | Molecular weight distribution PDI |
|---|---|---|---|---|---|
| 1a | 148 | 78.9 | 21.1 | 12734 | 2.1 |
| 1b | 107 | 78.9 | 21.1 | 91966 | 2.8 |
| 2C | 122 | 79.0 | 21.0 | 98997 | 2.8 |

TABLE 2

| Ex. N° | —I [% g/gpol] | Other chain ends [mmol/kg of polymer] —CF2H | —CF2CH3 | —CF2CH2OH |
|---|---|---|---|---|
| 1a | 1.55 | 20 | 4 | 1 |
| 1b | 0.20 | 29 | 10 | 1 |
| 2C | 0.21 | 31 | 10 | 1 |

Mechanical and Sealing Property Determination on Cured Samples

Fluoroelastomer of Example 1 (final fluoroelastomer from Ex.1b) and comparative fluoroelastomer of Example 2 were pre-compounded using a Brabender mixer with the cross-linking ingredients as listed in the table:

TABLE 5

| Compound recipe [phr] | |
|---|---|
| Polymer | 100 |
| Drimix ® TAIC 75 - Finco(*) | 3.0 |
| Luperox ® 101XL 45 peroxide - Atofina(**) | 1.5 |
| VULCAN 1391 - Cabot(***) | 10.0 |
| ZnO | 3.0 |

(*)TAIC: Drimix ® TAIC 75: triallylisocyanurate 75% wt dispersion in silica;
(**)Luperox 101 XL 45 peroxide is a 45% dispersion of 2,5 Dimethyl 2,5 Di(tert-butylperoxyl) hexane in calcium carbonate;
(***)Carbon Black Cure behaviour was determined according to ASTM D-6601, at a temperature of 170° C. for 12 minutes, by determining the following properties:

$M_L$=Minimum torque (lb*in)
$M_H$=Maximum torque (lb*in)

$$\Delta M = M_H - M_L$$

$t'_{90}$=Time to 90% state of cure (sec)

Mooney viscosity (MU) of raw rubbers has been determined according to ASTM D1646-07 as ML (1+10) at 121° C.

Plaques and O-rings (size class=214) have been cured in a pressed mould for 10 minutes at 170° C. and then post-treated in an air circulating oven ((1+4) h at 230° C.)

The tensile properties have been determined on specimens punched out from the plaques, according to the DIN 53504 Standard.

$M_{100}$ is the modulus in MPa at an elongation of 100%;
T.S. is the tensile strength in MPa;
E.B. is the elongation at break in %.

The Shore A hardness (3") (HDS) has been determined on 3 pieces of plaque piled according to the ASTM D 2240 method.

TABLE 6

| Example | MU | ML [lb * in] | MH [lb * in] | ΔM [lb * in] | t90 [sec] |
|---|---|---|---|---|---|
| 1 | 44 | 0.9 | 13.1 | 12.2 | 305 |
| 2C | 48 | 0.9 | 12.7 | 11.8 | 293 |

TABLE 7

| Example | T.S. [MPa] | E.B. [%] | M100 [Mpa] | HDS [Shore A] |
|---|---|---|---|---|
| 1 | 32.3 | 503 | 2.1 | 63 |
| 2C | 31.8 | 460 | 2.2 | 63 |

The invention claimed is:

1. A method for manufacturing fluoroelastomer (A), wherein fluoroelastomer (A) is a (per)fluoroelastomer, the method comprising:
   (a): polymerizing in an aqueous emulsion in the presence of a surfactant by feeding the following ingredients into a first reactor:
      (i) a monomer mixture (M1) comprising at least one monomer (F), wherein monomer (F) is a fluoromonomer,
      (ii) at least one iodinated and/or brominated chain-transfer agent(s),
      (iii) at least one branching agent possessing at least two ethylenic unsaturations; and
      (iv) at least one radical initiator,
   so as to obtain a pre-polymer latex (P), wherein pre-polymer latex (P) comprises particles of a pre-polymer having a number-averaged molecular weight of at least 1000 and at most 40000;
   (b): recovering latex (P) from the first reactor and storing the recovered latex (P) in a storage tank;
   (c): feeding the recovered latex (P) from the storage tank into a second reactor;
   (d): polymerizing in the second reactor at least a second monomer mixture (M2) comprising at least one monomer (F) in the presence of a radical initiator, so as to obtain a final latex (F); and
   (e): recovering fluoroelastomer (A) from latex (F).

2. The method of claim 1, wherein monomer mixture (M1) comprises at least one fluoromonomer selected from the group consisting of:
   $C_2$-$C_8$ perfluoroolefins;
   $C_2$-$C_8$ hydrogen-containing fluoroolefins;
   (per)fluoroalkylethylenes complying with formula $CH_2$=$CH$-$R_{f0}$, in which $R_{f0}$ is a $C_1$-$C_6$ (per)fluoroalkyl or a $C_1$-$C_6$ (per)fluorooxyalkyl having one or more ether groups;
   chloro- and/or bromo- and/or iodo-$C_2$-$C_6$ fluoroolefins;

fluoroalkylvinylethers complying with formula $CF_2=CFOR_{f1}$ in which $R_{f1}$ is a $C_1$-$C_6$ fluoro- or perfluoroalkyl;

hydrofluoroalkylvinylethers complying with formula $CH_2=CFOR_{f1}$ in which $R_{f1}$ is a $C_1$-$C_6$ fluoro- or perfluoroalkyl;

fluoro-oxyalkylvinylethers complying with formula $CF_2=CFOX_0$, in which $X_0$ is a $C_1$-$C_{12}$ oxyalkyl, or a $C_1$-$C_{12}$ (per)fluorooxyalkyl having one or more ether groups;

fluoroalkyl-methoxy-vinylethers complying with formula $CF_2=CFOCF_2OR_{f2}$ in which $R_{f2}$ is a $C_1$-$C_6$ fluoro- or perfluoroalkyl, or a $C_1$-$C_6$ (per)fluorooxyalkyl having one or more ether groups;

functional fluoro-alkylvinylethers complying with formula $CF_2=CFOY_0$, in which $Y_0$ is a $C_1$-$C_{12}$ alkyl or (per)fluoroalkyl, or a $C_1$-$C_{12}$ oxyalkyl or a $C_1$-$C_{12}$ (per)fluorooxyalkyl, said $Y_0$ group comprising a carboxylic or sulfonic acid group, in its acid, acid halide or salt form;

fluorodioxoles, of formula:

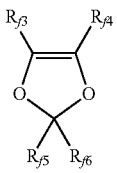

wherein each of $R_{f3}$, $R_{f4}$, $R_{f5}$, $R_{f6}$, equal or different each other, is independently a fluorine atom, a $C_1$-$C_6$ fluoro- or per(halo)fluoroalkyl, optionally comprising one or more oxygen atom.

3. The method of claim 2, wherein mixture (M1) is selected from the group consisting of:

(1) vinylidene fluoride (VDF) containing monomers mixtures, in which VDF is mixed with at least one comonomer different from VDF and selected from the group consisting of:

(a) $C_2$-$C_8$ perfluoroolefins;

(b) hydrogen-containing $C_2$-$C_8$ fluoro-olefins or perfluoroalkyl ethylenes of formula $CH_2=CH-R_f$, wherein $R_f$ is a $C_1$-$C_6$ perfluoroalkyl group;

(c) $C_2$-$C_8$ chloro and/or bromo and/or iodo-fluoroolefins;

(d) (per)fluoroalkylvinylethers (PAVE) of formula $CF_2=CFOR_f$, wherein $R_f$ is a $C_1$-$C_6$ (per)fluoroalkyl group;

(e) (per)fluoro-oxy-alkylvinylethers of formula $CF_2=CFOX$, wherein X is a $C_1$-$C_{12}$ ((per)fluoro)-oxyalkyl comprising catenary oxygen atoms;

(per)fluorodioxoles having formula:

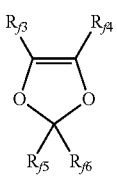

wherein $R_{f3}$, $R_{f4}$, $R_{f5}$, $R_{f6}$, equal or different from each other, are independently selected from fluorine atoms and $C_1$-$C_6$ (per)fluoroalkyl groups, optionally comprising one or more than one oxygen atom;

(g) (per)fluoro-methoxy-vinylethers (MOVE, hereinafter) having formula:

$CFX_2=CX_2OCF_2OR''_f$ wherein $R''_f$ is selected among $C_1$-$C_6$ (per)fluoroalkyls, linear or branched; $C_5$-$C_6$ cyclic (per)fluoroalkyls; and $C_2$-$C_6$ (per)fluorooxyalkyls, linear or branched, comprising from 1 to 3 catenary oxygen atoms, and $X_2$ is F or H;

(h) $C_2$-$C_8$ non-fluorinated olefins (Ol);

(i) ethylenically unsaturated compounds comprising nitrile (—CN) groups, optionally (per)fluorinated; and (2) tetrafluoroethylene (TFE) containing monomers mixtures, in which TFE is mixed with at least one comonomer different from TFE and selected from the group consisting of monomers of classes (a), (c), (d), (e), (g), and (i), as above detailed.

4. The method according to claim 1, wherein step (a) comprises polymerizing the mixture (M1) in an aqueous emulsion in the presence of a fluorinated surfactant (FS) selected from the group consisting of:

$CF_3(CF_2)_{n1}COOM'$, in which $n_1$ is an integer ranging from 4 to 10; and M' represents H, $NH_4$, Na, Li or K;

$T(C_3F_6O)_{n0}(CFXO)_{m0}CF_2COOM''$ [formula ($FS_1$)], in which T represents Cl or a perfluoroalkoxyde group of formula $C_kF_{2k+1}O$ wherein k is an integer from 1 to 3, one F atom being optionally substituted by a Cl atom; $n_0$ is an integer ranging from 1 to 6; $m_0$ is an integer ranging from 0 to 6; M'' represents H, $NH_4$, Na, Li or K; and X represents F or $CF_3$;

$F-(CF_2-CF_2)_{n2}-CH_2-CH_2-RO_3M'''$, in which R is P or S, M''' represents H, $NH_4$, Na, Li or K; and $n_2$ is an integer ranging from 2 to 5;

A—$R_f$—B bifunctional fluorinated surfactants, in which A and B, equal to or different from each other, are —(O)$_p$ CFX—COOM*; M* represents H, $NH_4$, Na, Li or K; X is F or $CF_3$; p is an integer equal to 0 or 1; and $R_f$ is a linear or branched perfluoroalkyl chain, or a (per)fluoropolyether chain such that the number average molecular weight of A—$R_f$—B is in the range 300 to 3,000;

$R'_f$—O—$(CF_2)_r$—O—L—COOM', wherein $R'_f$ is a linear or branched perfluoroalkyl chain, optionally comprising catenary oxygen atoms, M' is H, $NH_4$, Na, Li or K; r is 1 to 3; L is a bivalent fluorinated bridging group;

$R''_f$—$(OCF_2)_u$—O—$(CF_2)_v$—COOM'', wherein $R''_f$ is a linear or branched perfluoroalkyl chain, optionally comprising catenary oxygen atoms, M'' is H, $NH_4$, Na, Li or K; u and v are integers from 1 to 3;

$R'''_f$—$(O)_t$—CHQ—L—COOM''', wherein $R'''_f$ is a linear or branched perfluoroalkyl chain, optionally comprising catenary oxygen atoms, Q is F or $CF_3$, t is 0 or 1, M''' is H, $NH_4$, Na, Li or K; L is a bivalent fluorinated bridging group;

cyclic fluorocompounds of the following formula (I):

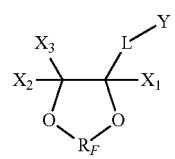

(I)

wherein $X_1$, $X_2$, $X_3$, equal or different from each other are independently selected from H, F, and $C_{1-6}$(per)fluoroalkyl groups, optionally comprising one or more catenary or non-catenary oxygen atoms; L represents a bond or a divalent group; $R_F$ is a divalent fluorinated $C_{1-3}$ bridging group; Y is a hydrophilic function selected from the group consisting of those of formulae:

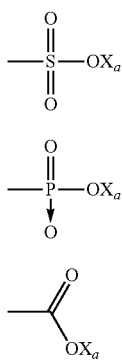

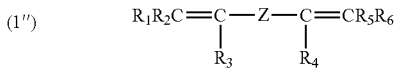

wherein $X_a$ is H, a monovalent metal or an ammonium group of formula $-N(R'_n)_4$, wherein $R'_n$, equal or different at each occurrence, represents a hydrogen atom or a $C_{1-6}$ hydrocarbon group;

and mixtures thereof.

5. The method of claim 4, wherein the aqueous emulsion of step (a) further includes an additional non-functional fluorinated fluid selected from (per)fluoropolyethers complying with formula (I-p):

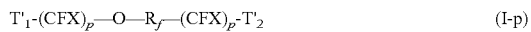

wherein:

each of X is independently F or $CF_3$;

p and p', equal or different each other, are integers from 0 to 3;

$R_f$ is a fluoropolyoxyalkene chain comprising repeating units $R^0$, said repeating units being selected from the group consisting of:

(i) $-CFXO-$, wherein X is F or $CF_3$, (ii) $-CF_2CFXO-$, wherein X is F or $CF_3$, (iii) $-CF_2CF_2CF_2O-$, (iv) $-CF_2CF_2CF_2CF_2O-$, (v) $-(CF_2)_j-CFZ-O-$ wherein j is an integer chosen from 0 and 1 and Z is a group of general formula $-OR'_fT_3$, wherein $R'_f$ is a fluoropolyoxyalkene chain comprising a number of repeating units from 0 to 10, said recurring units being selected from: $-CFXO-$, $-CF_2CFXO-$, $-CF_2CF_2CF_2O-$, $-CF_2CF_2CF_2CF_2O-$, with each of X being independently F or $CF_3$; and $T_3$ is a $C_1-C_3$ perfluoroalkyl group, and mixtures thereof;

$T'_1$ and $T'_2$, the same or different from each other, are H, halogen atoms, or $C_1-C_3$ fluoroalkyl groups, optionally comprising one or more H or halogen atoms different from fluorine.

6. The method according to claim 1, wherein the iodinated and/or brominated chain-transfer agent is selected from the group consisting of those of formula $R_f(I)_x(Br)_y$, in which $R_f$ is a (per)fluoroalkyl or a (per)fluorochloroalkyl containing from 1 to 8 carbon atoms, x and y are integers between 0 and 2, with $1 \leq x+y \leq 2$ and wherein the amount of iodinated and/or brominated chain-transfer agent(s) fed during step (a) is of at least 1.0 weight part per 100 weight parts of pre-polymer manufactured in step (a) and/or is of at most 4.0 weight parts per 100 weight parts of pre-polymer manufactured in step (a).

7. The method according to claim 1, wherein the branching agent possessing at least two ethylenic unsaturations is generally a bis-olefin (OF) having general formula :

$$R_1R_2C=C-Z-C=CR_5R_6$$
$$\phantom{R_1R_2C=C-}|\phantom{-Z-}|$$
$$\phantom{R_1R_2C=C-}R_3\phantom{-Z-}R_4$$

wherein $R_1$, $R_2$, $R_3$, $R_4$, $R_5$ and $R_6$, equal or different from each other, are H or $C_1-C_5$ alkyl; Z is a linear or branched $C_1-C_{18}$ alkylene or cycloalkylene radical, optionally containing oxygen atoms, optionally at least partially fluorinated, or a (per)fluoropolyoxyalkylene radical and wherein the amount of branching agent possessing at least two ethylenic unsaturations fed in step (a) is of at most 1% wt, with respect to the total weight of pre-polymer obtained in step (a).

8. The method according to claim 1, wherein pre-polymer latex (P) comprises particles of a pre-polymer having a number-averaged molecular weight of at least 5000 and/or at most 30000, and/or having a PDI of at least 1.2 and/or of at most 3.5.

9. The method according to claim 8, wherein pre-polymer latex (P) comprises particles of a pre-polymer having a number-averaged molecular weight of at least 10000 and at most 20000, and/or having a PDI of at least 1.5 and of at most 2.8.

10. The method according to claim 1, wherein pre-polymer latex (P) comprises particles of a pre-polymer having a iodine and/or bromine content of at least 0.5%, with respect to the weight of the pre-polymer and/or of at most 3.0%, with respect to the weight of the pre-polymer.

11. The method according to claim 10, wherein pre-polymer latex (P) comprises particles of a pre-polymer having a iodine and/or bromine content of at least 1.2% wt, with respect to the weight of the pre-polymer and of at most 2.0% wt, with respect to the weight of the pre-polymer.

12. The method according to claim 1, wherein in step (b), latex (P) is recovered from the first reactor in a storage tank for a storage time of at least 1 hour.

13. The method according to claim 1, wherein the second reactor is different from the first reactor, which is not equipped for metering branching agent and/or for metering iodinated and/or brominated chain transfer agent.

14. The method according to claim 1, wherein monomer mixture (M2)-comprises at least one fluoromonomer selected from the group consisting of:

$C_2-C_8$ perfluoroolefins;

$C_2-C_8$ hydrogen-containing fluoroolefins;

(per)fluoroalkylethylenes complying with formula $CH_2=CH-R_{f0}$, in which $R_{f0}$ is a $C_1-C_6$ (per)fluoroalkyl or a $C_1-C_6$ (per)fluorooxyalkyl having one or more ether groups;

chloro- and/or bromo- and/or iodo-$C_2-C_6$ fluoroolefins;

fluoroalkylvinylethers complying with formula $CF_2=CFOR_{f1}$ in which $R_{f1}$ is a $C_1-C_6$ fluoro- or perfluoroalkyl;

hydrofluoroalkylvinylethers complying with formula $CH_2=CFOR_{f1}$ in which $R_{f1}$ is a $C_1-C_6$ fluoro- or perfluoroalkyl;

fluoro-oxyalkylvinylethers complying with formula $CF_2=CFOX_0$, in which $X_0$ is a $C_1-C_{12}$ oxyalkyl, or a $C_1-C_{12}$ (per)fluorooxyalkyl having one or more ether groups;

fluoroalkyl-methoxy-vinylethers complying with formula $CF_2=CFOCF_2OR_{f2}$ in which $R_{f2}$ is a $C_1-C_6$ fluoro- or perfluoroalkyl, or a $C_1-C_6$ (per)fluorooxyalkyl having one or more ether groups;

functional fluoro-alkylvinylethers complying with formula $CF_2=CFOY_0$, in which $Y_0$ is a $C_1-C_{12}$ alkyl or (per)fluoroalkyl, or a $C_1$-$C_{12}$ oxyalkyl or a $C_1$-$C_{12}$ (per)fluorooxyalkyl, said $Y_0$ group comprising a carboxylic or sulfonic acid group, in its acid, acid halide or salt form;

fluorodioxoles, of formula:

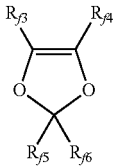

wherein each of $R_{f3}$, $R_{f4}$, $R_{f5}$, $R_{f6}$, equal or different each other, is independently a fluorine atom, a $C_1$-$C_6$ fluoro- or per(halo)fluoroalkyl, optionally comprising one or more oxygen atom.

15. The method of claim 14, wherein mixture (M2) is selected from the group consisting of:

(1) vinylidene fluoride (VDF) containing monomers mixtures, in which VDF is mixed with at least one comonomer different from VDF and selected from the group consisting of:

(a) $C_2$-$C_8$ perfluoroolefins;

(b) hydrogen-containing $C_2$-$C_8$ fluoro-olefins or perfluoroalkyl ethylenes of formula $CH_2=CH-R_f$, wherein $R_f$ is a $C_1$-$C_6$ perfluoroalkyl group;

(c) $C_2$-$C_8$ chloro and/or bromo and/or iodo-fluoroolefins;

(d) (per)fluoroalkylvinylethers (PAVE) of formula $CF_2=CFOR_f$, wherein $R_f$ is a $C_1$-$C_6$ (per)fluoroalkyl group;

(e) (per)fluoro-oxy-alkylvinylethers of formula $CF_2=CFOX$, wherein X is a $C_1$-$C_{12}$ ((per)fluoro)-oxyalkyl comprising catenary oxygen atoms;

(f) (per)fluorodioxoles having formula:

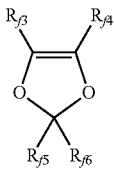

wherein $R_{f3}$, $R_{f4}$, $R_{f5}$, $R_{f6}$, equal or different from each other, are independently selected from fluorine atoms and $C_1$-$C_6$ (per)fluoroalkyl groups, optionally comprising one or more than one oxygen atom;

(g) (per)fluoro-methoxy-vinylethers (MOVE, hereinafter) having formula:

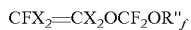

$CFX_2=CX_2OCF_2OR''_f$ wherein $R''_f$ is selected among $C_1$-$C_6$ (per)fluoroalkyls, linear or branched; $C_5$-$C_6$ cyclic (per)fluoroalkyls; and $C_2$-$C_6$ (per)fluorooxyalkyls, linear or branched, comprising from 1 to 3 catenary oxygen atoms, and $X_2$ is F or H;

(h) $C_2$-$C_8$ non-fluorinated olefins (Ol);

(i) ethylenically unsaturated compounds comprising nitrile (—CN) groups, optionally (per)fluorinated; and (2) tetrafluoroethylene (TFE) containing monomers mixtures, in which TFE is mixed with at least one comonomer different from TFE and selected from the group consisting of monomers of classes (a), (c), (d), (e), (g), and (i), as above detailed.

16. The method according to claim 1, wherein the weight ratio between the amount of mixture (M2) converted in step (d) and the amount of pre-polymer fed to the second reactor as latex (P) is of at least 2 weight parts of mixture (M2) converted per weight part of pre-polymer, and/or at most 20 weight parts of mixture (M2) converted per weight part of pre-polymer and/or wherein the weight fraction of fluoroelastomer (A) produced in step (a) is less than 33% weight, with respect to the total weight of fluoroelastomer (A).

17. The method according to claim 16, wherein the weight ratio between the amount of mixture (M2) converted in step (d) and the amount of pre-polymer fed to the second reactor as latex (P) is of at least 5 weight parts of mixture (M2) converted per weight part of pre-polymer, and at most 15 weight parts of mixture (M2) converted per weight part of pre-polymer and/or wherein the weight fraction of fluoroelastomer (A) produced in step (a) is less than 18% weight, with respect to the total weight of fluoroelastomer (A).

18. The method according to claim 1, wherein fluoroelastomer (A) possesses a number-averaged molecular weight of at least 40000 and/or of at most 150000.

19. The method according to claim 18, wherein fluoroelastomer (A) possesses a number-averaged molecular weight of at least 80000 and of at most 120000.

20. The method according to claim 1, wherein the iodine and/or bromine content of fluoroelastomer (A) is reduced by a factor equal to the weight of fluoroelastomer (A) over the weight of pre-polymer obtained from step (a) and/or wherein the branching agent content in fluoroelastomer (A) is reduced by a factor equal to the weight of fluoroelastomer (A) over the weight of pre-polymer obtained from step (a).

* * * * *

UNITED STATES PATENT AND TRADEMARK OFFICE
CERTIFICATE OF CORRECTION

PATENT NO. : 10,882,935 B2
APPLICATION NO. : 16/061965
DATED : January 5, 2021
INVENTOR(S) : Marco Dossi et al.

Page 1 of 1

It is certified that error appears in the above-identified patent and that said Letters Patent is hereby corrected as shown below:

On the Title Page
Item (57) ABSTRACT, the last line, "(d): recovering" should read -- (e): recovering --.

In the Claims
At Column 17, Claim number 2, Line number 30, the phrase "equal or different each other" should read -- equal or different from each other --.
At Column 17, Claim number 3, Line number 51, the term "(per)fluorodioxoles" should read
-- (f) (per)fluorodioxoles --.
At Column 19, Claim number 5, Line number 28, the formula (I-p) "T'1–(CFX)p–O–Rf–(CFX)p–T'2" should read -- T'1–(CFX)p–O–Rf–(CFX)p'–T'2 --.
At Column 19, Claim number 5, Line number 42, the formula "–Orf'T3" should read -- –ORf'T3 --.

Signed and Sealed this
Eighteenth Day of May, 2021

Drew Hirshfeld
*Performing the Functions and Duties of the*
*Under Secretary of Commerce for Intellectual Property and*
*Director of the United States Patent and Trademark Office*